July 7, 1936.                G. SUNDBACK                2,046,796
SEPARABLE INTERLOCKING FASTENER
Filed Sept. 1, 1933
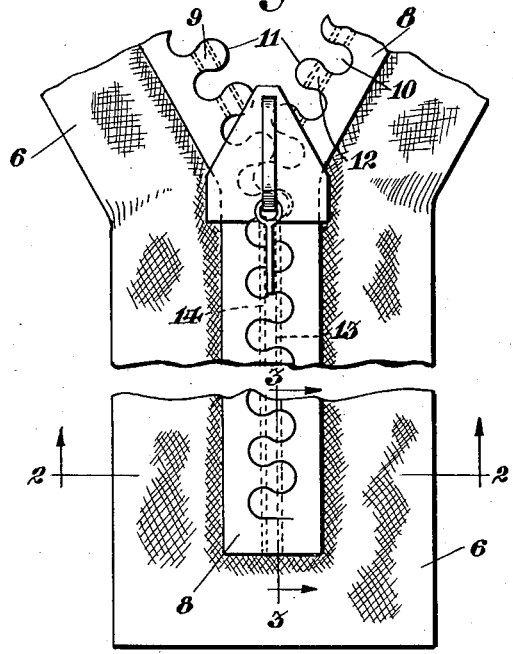
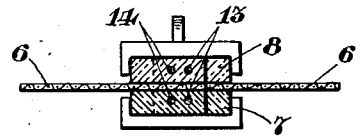
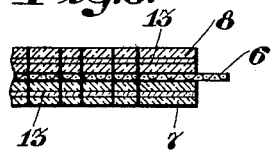
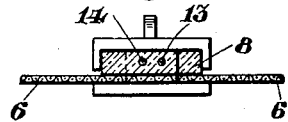
INVENTOR.
Gideon Sundback
BY Kelley & Chisholm.
ATTORNEY.

Patented July 7, 1936

2,046,796

UNITED STATES PATENT OFFICE 2,046,796

SEPARABLE INTERLOCKING FASTENER

Gideon Sundback, Meadville, Pa., assignor to Hookless Fastener Company, Meadville, Pa., a corporation of Pennsylvania Application September 1, 1933, Serial No. 687,800

6 Claims. (Cl. 24—205)

My invention relates to separable interlocking fasteners and particularly to fasteners formed of yieldable material such as rubber, leather, fabric, etc.

Fasteners of the type mentioned have previously been proposed in which interlocking elements of yieldable materials such as rubber are used. The strength of such fasteners, that is, the resistance to separation depends upon the resistance to compression of the yieldable interlocking elements, and thus is limited by the compressibility of the material. It is among the objects of the present invention to provide an improved fastener which has the inherent advantages both of fasteners made of yieldable material and of fasteners made of rigid materials.

More specifically, it is one of the objects of the invention to provide a fastener of flexible or yieldable material, the fastener having yielding compression members which prevent the compression of the yieldable material.

The term "yieldable" as used herein and in the appended claims means yieldable to such an extent that the deformation occurring in ordinary use can readily be perceived by the senses without special measuring instruments, whereas the term "nonyieldable" or rigid is used to define materials which will not deform perceptibly in ordinary use. Examples of yieldable material would be rubber, leather, fabric, and examples of nonyieldable material would be metal, wood, and hard plastic materials.

In the accompanying drawing I have shown for the purpose of illustration, one embodiment which my invention may assume in practice. In this drawing:

Fig. 1 is a plan view of a fastener embodying my invention;

Fig. 2 is a cross-section on line 2—2 of Fig. 1;

Fig. 3 is a longitudinal section on line 3—3 of Fig. 1; and

Fig. 4 is a cross-section showing a modification.

The construction and operation of the fastener disclosed herein is similar to that described in the patent to Harry E. Sipe No. 1,719,856, and reference may be had to that patent for a full description of the operation.

As herein shown, the fastener comprises a fabric strip 6 divided down the middle to provide two mounting strips adapted for attaching the fastener in an article to be closed. The interlocking member strips designated 7, 8 are attached to the mounting strips in any convenient manner such as by stitching, cementing, vulcanizing or the like. The strips 8 may be formed of any yieldable material such as rubber, leather or fabric. Such materials have a certain degree of resistance against compression, and use is made of this property to provide the necessary resistance to separation of the strips.

The flexible strips 8 are cut along the longitudinal center line in such a manner as to form gear tooth-like projections 9 arranged in staggered relation so as to intermesh, the projections on one side engaging in the recesses 10 on the opposite side. Each projection has a head 11 integrally joined to the strip by a narrower neck 12. When the strips are flexed away from each other in their own plane the projections separate, as shown in the upper part of Fig. 1, so that a head on one strip may be passed between two adjacent heads on the opposite strip and when the strips are subsequently straightened each head 11 will be engaged in a recess 10 on the opposite strip. This interlocking action may be accomplished by any suitable form of slider which either progressively engages or progressively disengages the projections. As so far described, the fastener structure is known. If force is applied to the strips tending to separate them laterally, this force tends to drag each head or interlocking element laterally through the narrow space between two adjacent heads on the opposite strip. This sets up forces tending to compress the heads longitudinally of the fastener. The fastener will not separate until this longitudinal compression has narrowed the heads to the point where they can slide out between the two adjacent heads on the opposite strip. The low resistance to compression of this type of material limits the strength or resistance to separation of the fastener.

In accordance with my invention I provide each interlocking projection with a rigid strut or compression member which takes the force of compression exerted on the interlocking element when force is applied tending to separate the fastener. The compression member is inserted or embedded in each projection at its widest point longitudinally of the slide fastener. One way of accomplishing this is by embedding or molding one or more wires 13, 14 of rigid material in the strip from which the fastener is to be cut. Thereafter when the strips are cut through by a die the wires 13, 14 will also be cut and leave small sections which extend through the heads and necks of the projecting members. These wires can be made of metal or preferably of a material which can be more easily cut, such as celluloid, hard rubber or wood.

In Fig. 2 there are illustrated two pairs of flexible strips 7 and 8, one on each side of the mounting tapes. In Fig. 4 there is shown a modification wherein a single strip on only one side of the mounting tapes is employed. The latter fastener will be thinner and when reinforced in the manner described, it will possess sufficient strength for many purposes.

While I have shown and described in this application one embodiment which my invention may assume in practice, it will be understood that this embodiment is merely for the purposes of illustration and description and that various other forms may be devised within the scope of my invention as defined in the appended claims.

What I claim as my invention is:

1. In a separable interlocking fastener, two interlocking member strips consisting principally of flexible rubber and having heads of the same material in the form of tooth-like projections along the adjacent edges of the strips and integral with the strips, said projections adapted to intermesh and interlock behind one another whereby separation is resisted by compression of the heads of said projections longitudinally of the strips, and a plurality of compression members embedded in said rubber projections and extending longitudinally of the fastener entirely through each projection, the compression members of one projection registering with the compression members of the adjacent projection when the fastener is engaged.

2. In a separable interlocking fastener, two rows of interlocking elements, the elements in each row being in uniformly spaced relation and adapted to be progressively interengaged or disengaged with the elements in the other row, the interlocking elements being made of yieldable material and adapted to prevent lateral separation of the rows by the resistance to compression of the elements, and a rigid strut carried by each interlocking element and extending throughout the head of such element in the lengthwise direction of the fastener for receiving forces tending to compress the interlocking elements.

3. A fastener as defined in claim 2 wherein the struts are embedded in the interlocking elements.

4. A fastener as defined in claim 2 wherein the struts are embedded in and pass through the interlocking elements.

5. A separable interlocking fastener of the structure defined in claim 1, wherein said compression members are metal wires which in the closed fastener, form substantially continuous columns extending throughout the length of the fastener.

6. In a separable interlocking fastener, a pair of interlocking member strips consisting principally of flexible rubber and having heads of the same material in the form of tooth-like projections along the adjacent edges of the strips and integral with the strips, said projections each having a head portion joined to the strip by a narrower neck portion and said projections being spaced to form recesses corresponding in size and shape to the projections, said projections on the opposite strips being staggered whereby they may intermesh and interlock behind one another, and rigid means carried by each head for positively preventing compression of said head to such size as to allow removal from said recess.

GIDEON SUNDBACK.